Jan. 9, 1962  H. A. McMASTER ETAL  3,015,910
GLASS TEMPERING FURNACE

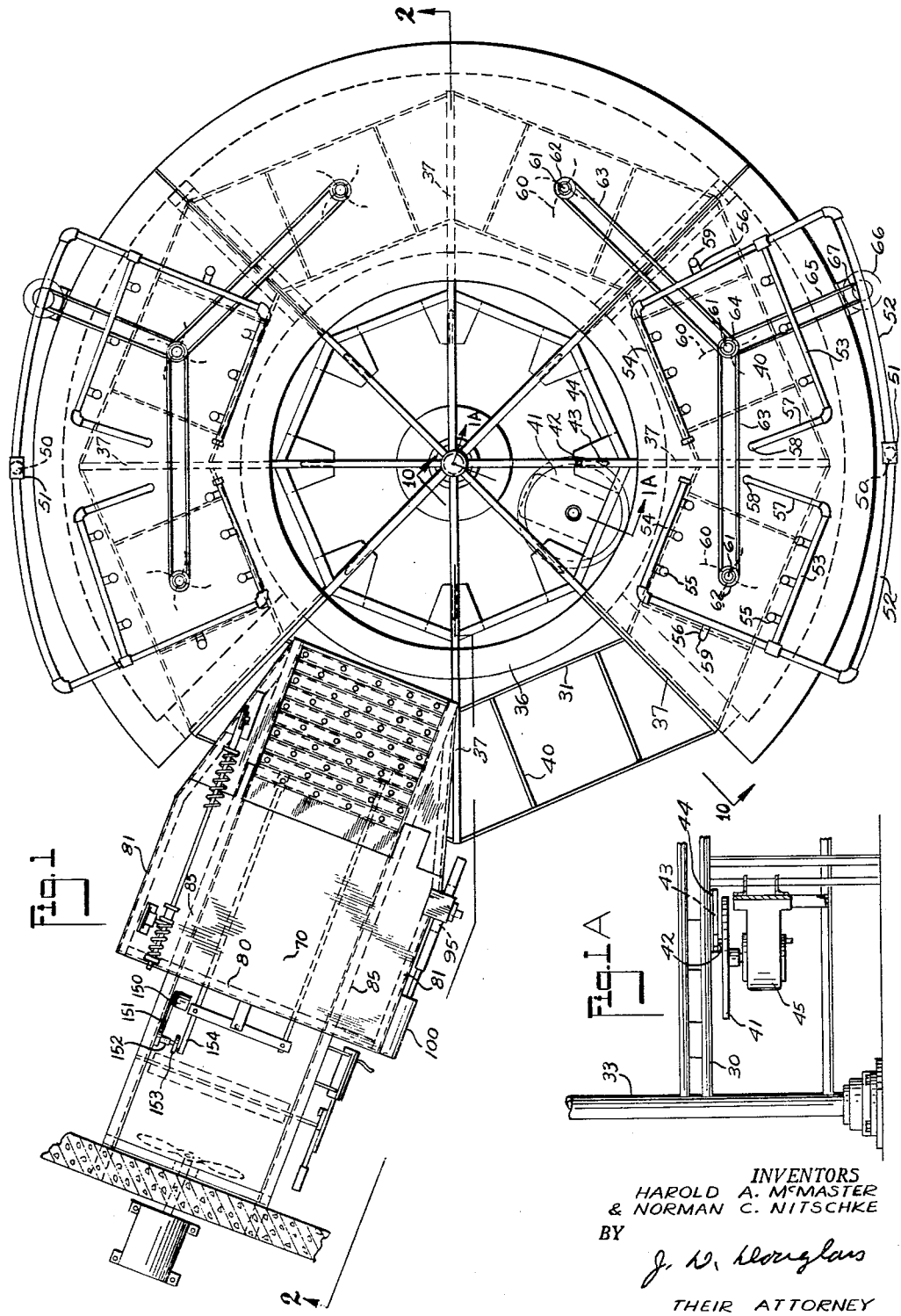

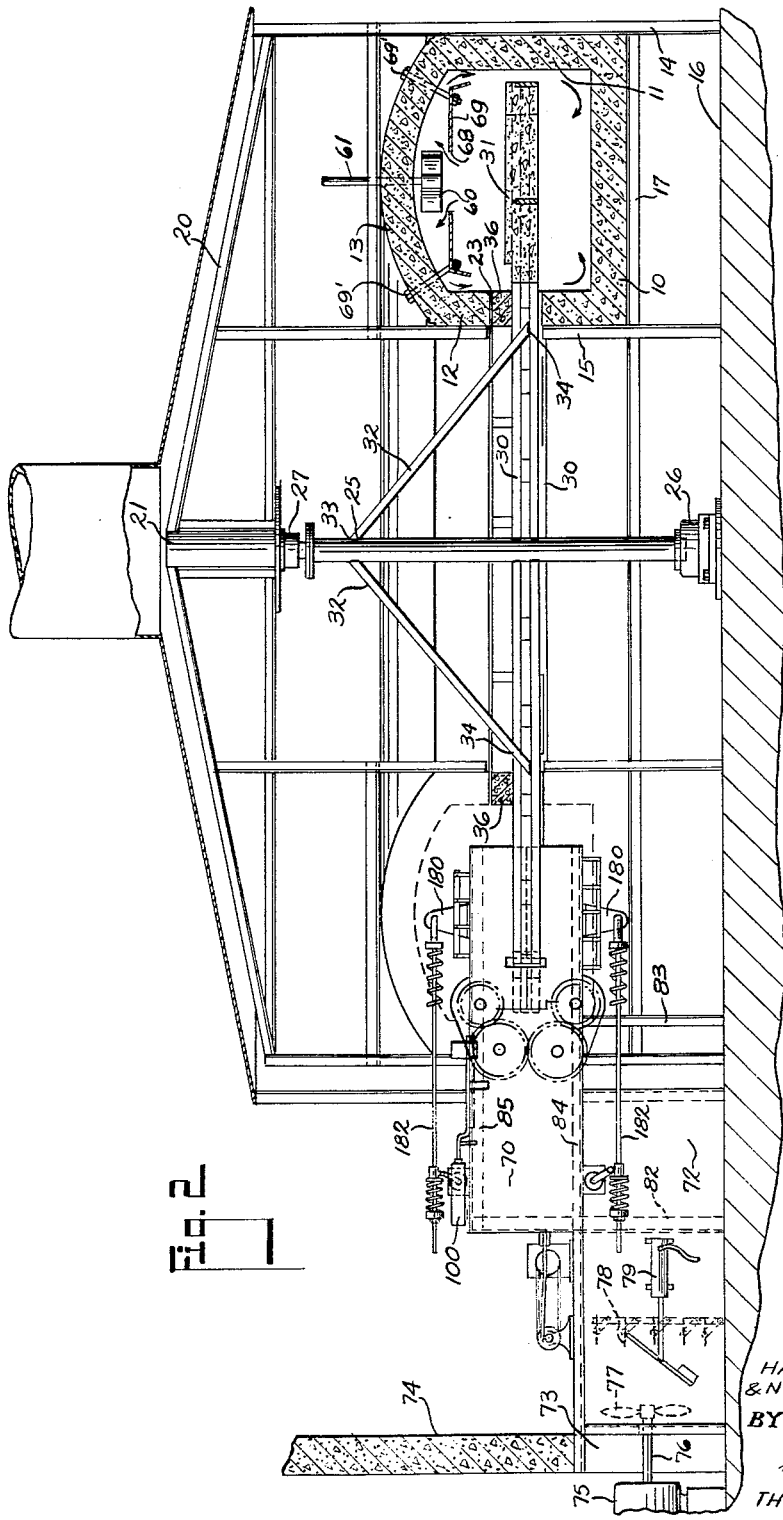

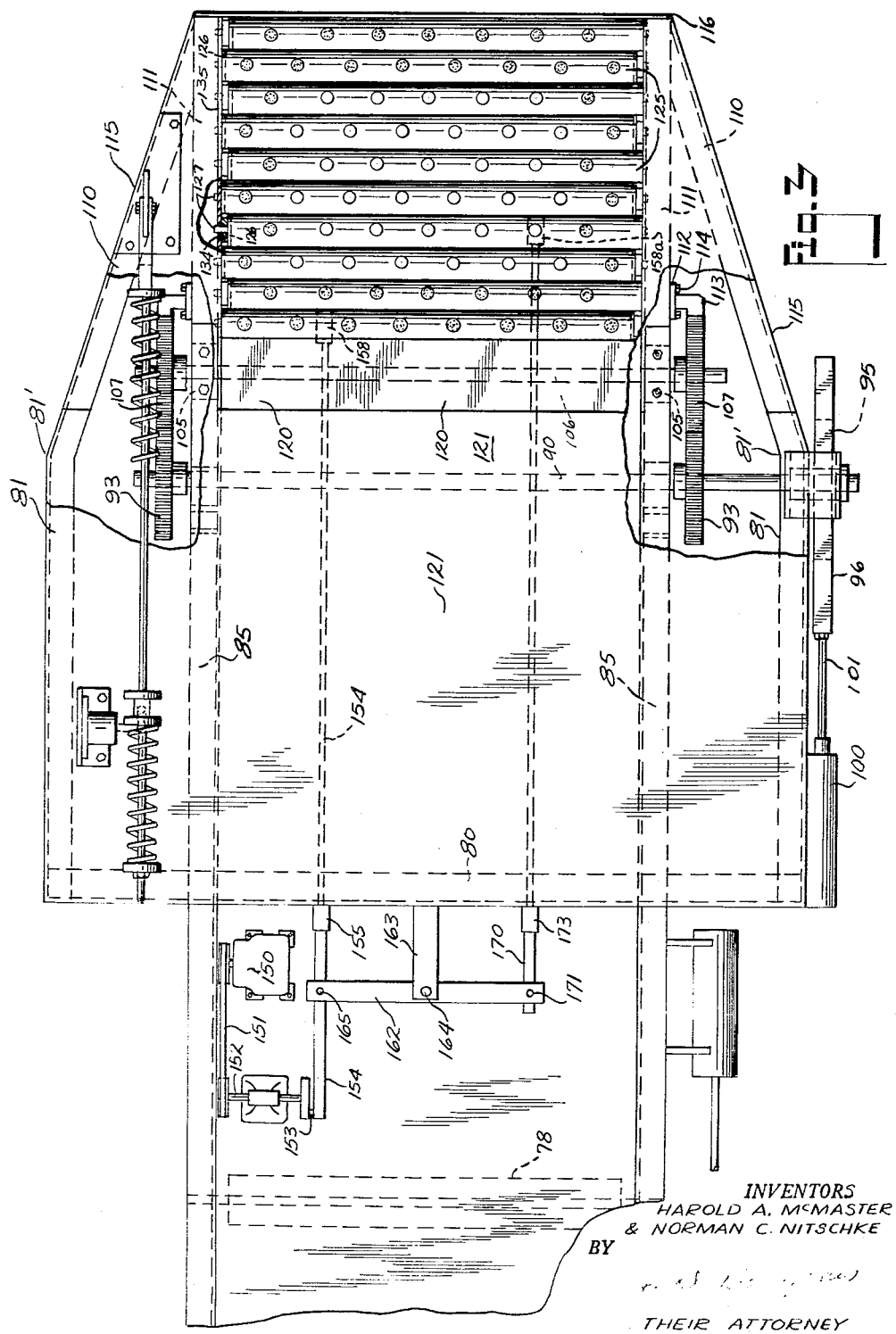

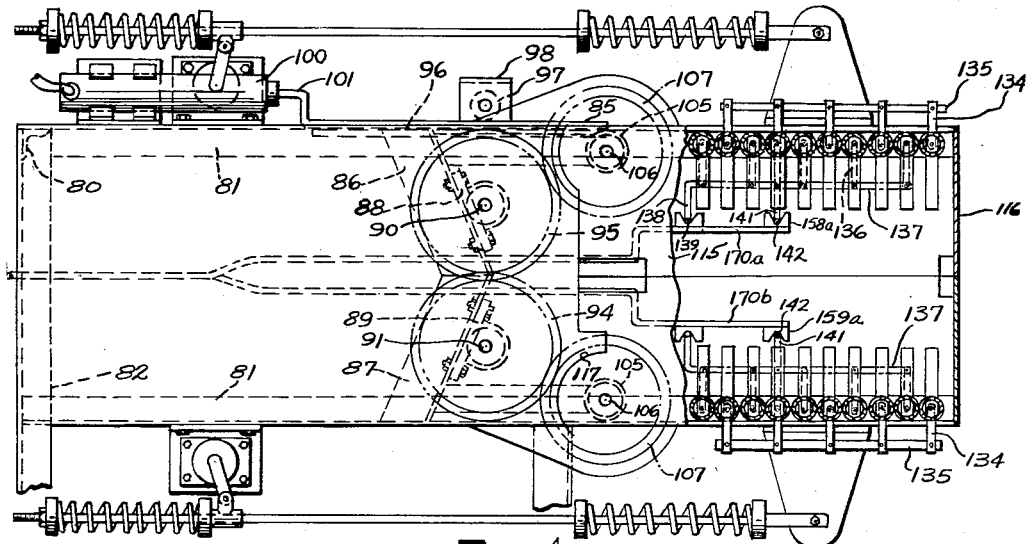
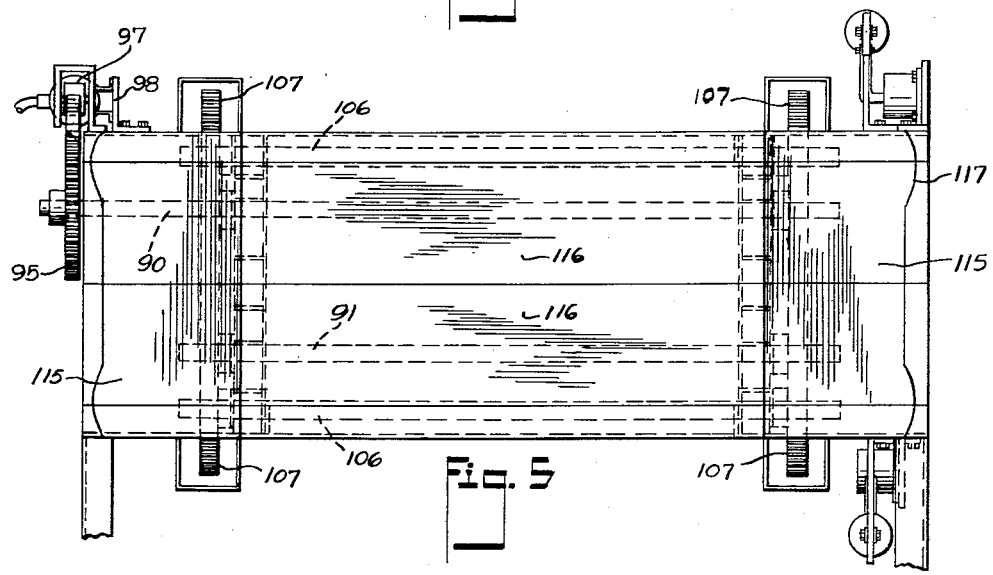
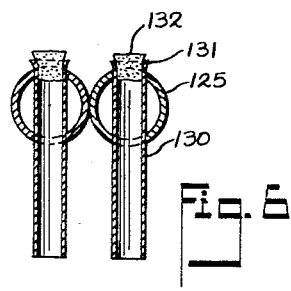 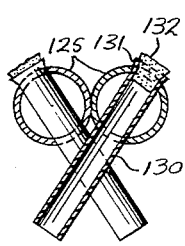
INVENTORS
HAROLD A. McMASTER
& NORMAN C. NITSCHKE
BY
THEIR ATTORNEY

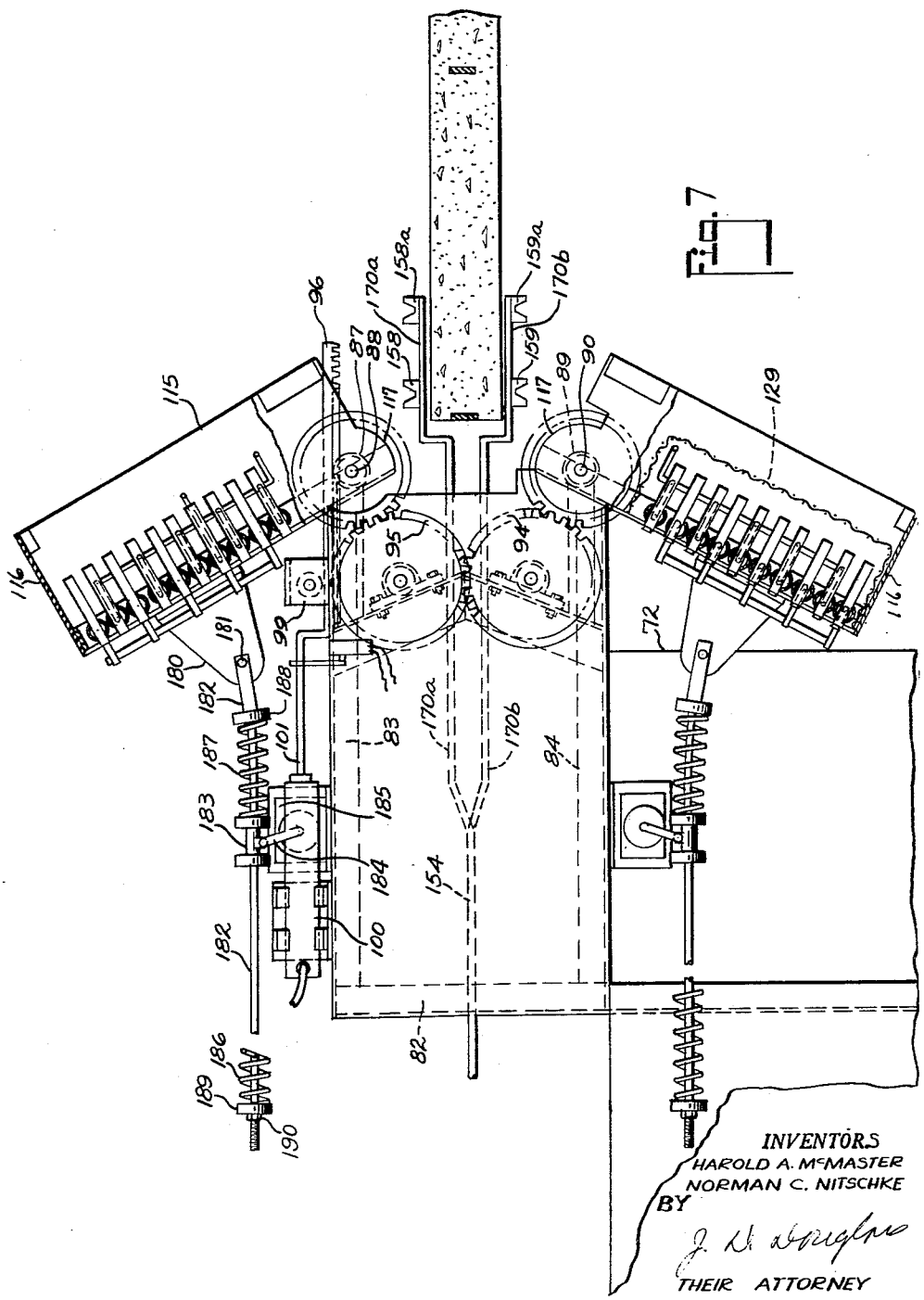

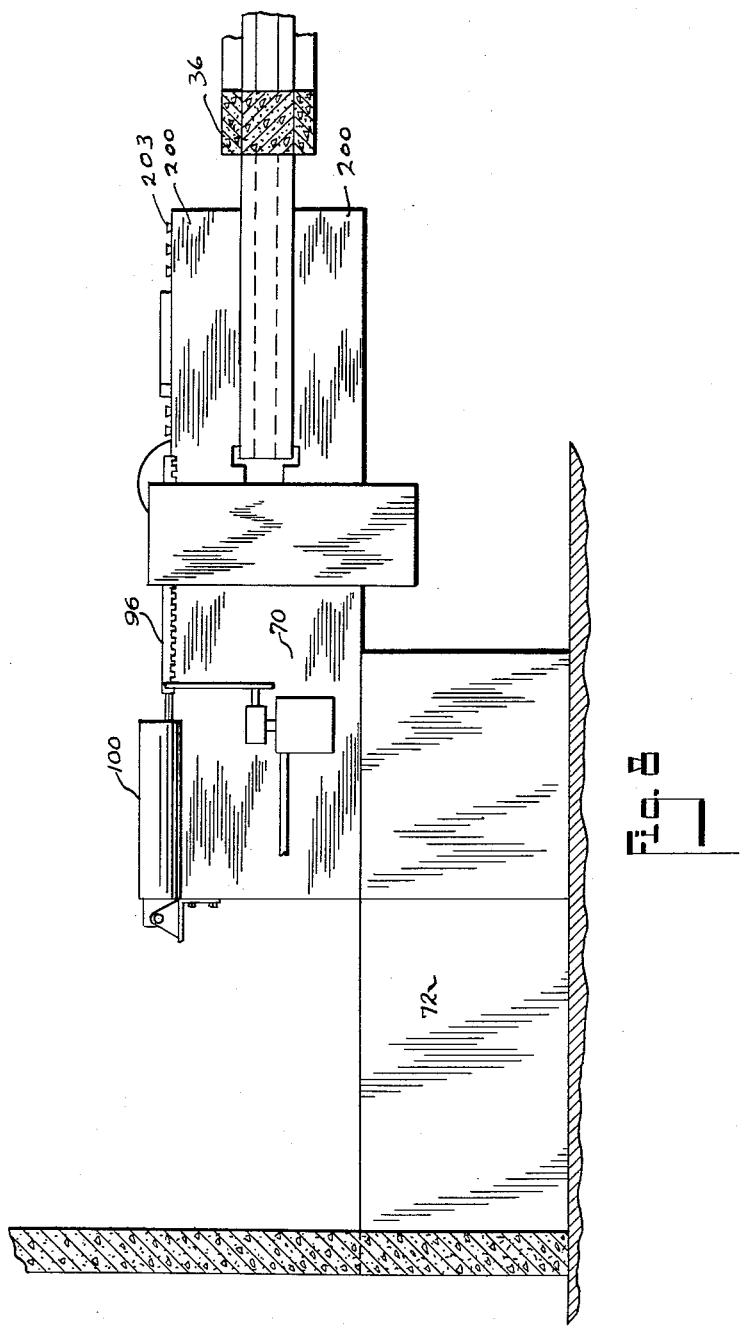

Filed May 23, 1955  8 Sheets-Sheet 7

INVENTORS
HAROLD A. McMASTER
& NORMAN C. NITSCHKE
BY
J. D. Douglass
THEIR ATTORNEY Jan. 9, 1962 H. A. McMASTER ETAL 3,015,910
GLASS TEMPERING FURNACE
Filed May 23, 1955
8 Sheets-Sheet 8
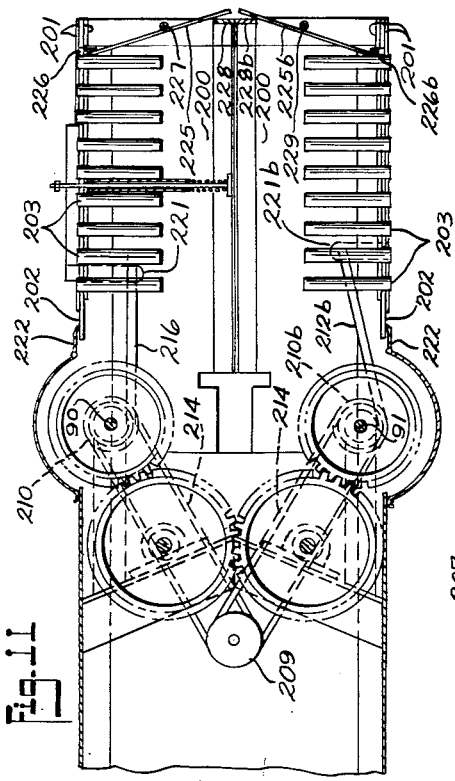
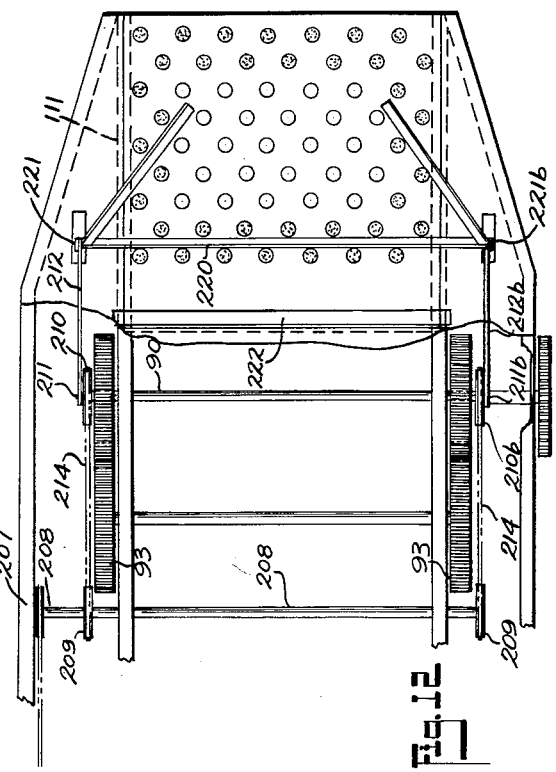
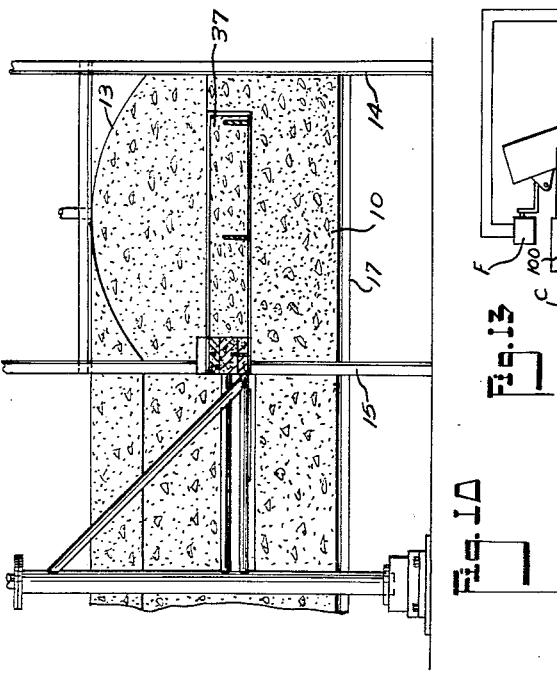
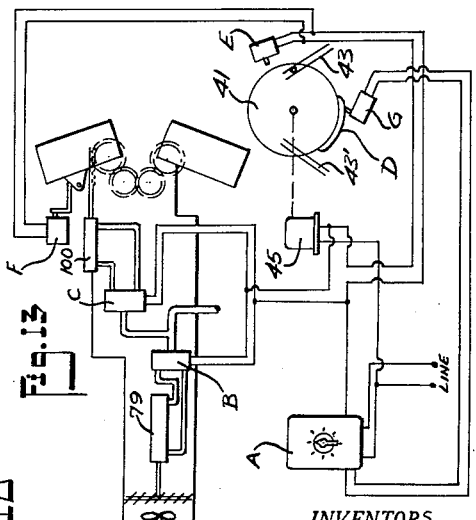
INVENTORS
HAROLD A. McMASTER
& NORMAN C. NITSCHKE
BY
*J. W. Douglas*
THEIR ATTORNEY

United States Patent Office 3,015,910
Patented Jan. 9, 1962

3,015,910
GLASS TEMPERING FURNACE
Harold A. McMaster, Genoa, and Norman C. Nitschke, Perrysburg, Ohio, assignors to Permaglass, Inc., Genoa, Ohio
Filed May 23, 1955, Ser. No. 510,108
12 Claims. (Cl. 49—45)

This invention relates to apparatus for tempering glass, and more particularly to improvements in glass tempering furnaces.

As is well known to those versed in the art, tempering of glass is effected by heating the glass to the softening point in a furnace, after which jets of cool air are directed against the surface from opposite sides to cause a rapid cooling of the surface which places the surface of the glass under compression and greatly increasing the strength. Such glass has a characteristic when broken, that causes it to shatter into a multitude of small pieces which vary in size from one-eighth to three-eighths inch in diameter according to the type of tempering.

Heretofore, it has been customary to provide a furnace which extends in a straight line. The glass is moved into the furnace from one end and through the furnace by a conveyor which carries the sheets of glass on racks. The glass is heated in stages in the furnace, and after it emerges from the furnace is finally moved into a blast head, at the exit end, where cool air is forced through jets against the surface of the glass cooling the glass. The glass then moves out of the blast head and is removed.

Such a furnace takes up considerable space in the factory. Considerable difficulty is encountered when it is desired to temper curved sheets of glass because the type of furnace described does not easily lend itself to handling glass that is to be curved. This is particularly true where the glass assumes its curvature during heating.

In addition to the foregoing overhead tracks must be provided through the furnace and a return track alongside the furnace for the return of the conveyor. Usually the conveyor is loaded by an operator at one end and the tempered glass removed by another operator at the other end.

By the present invention we are able to provide a furnace where the glass may be easily moved through this furnace in a horizontal position as contrasted to the vertical position in the prior devices. The glass being in a horizontal position may be supported on suitable forms to cause it to take a bend of a particular configuration, which bend can be accurately controlled by a form which supports the glass. In such a furnace, about to be described, a reduction in operating personnel is realized because the loading and unloading stations are at the same position and one operator can perform both functions. Another advantage is realized in that the overhead conveyors and their maintenance are completely eliminated.

Briefly, the invention includes a substantially toroidal furnace having a segment removed at one portion, which is the loading and unloading station as well as the tempering station. Centrally of the furnace there is provided a rotatable support having arms that extend outwardly from the center and through a slot in the innermost wall of the furnace into the furnace where they support conveying means for carrying glass supporting racks. The entire support revolves intermittently to carry the glass in a circular path through the toroidal furnace from the loading and unloading ends back to the blast head. The conveyor is so constructed that it closes the slot both in the inner periphery and also at the entrance and exit to the furnace. A blast head is provided at the exit of the furnace next to the loading station and contemplates a box or header which is formed in two parts hinged at the end away from the conveyor and which parts may be opened or swung apart to allow the conveyor to be moved therebetween and when they are closed they close around and enclose the conveyor and the glass sheet carried thereby. Each of the head portions are provided with a plurality of swingable jets. The head is connected to a duct having means therein for drawing a vacuum thus sucking air from the ambient atmosphere through the jets into the heads and against the glass. The air, after being heated by striking the glass, may then be discharged through the duct outside the plant.

The operator, being positioned beside the blast head, loads the untempered glass into a conveyor which is moved in an intermittent fashion through the furnace, traveling around the furnace until it eventually arrives at the blast head where the final phase of the tempering action occurs after which it moves to the position where the operator may remove the tempered glass and replace it with a sheet of untempered glass.

The construction of the blast head is such that since the air is drawn from the ambient atmosphere certain of the jets may be plugged to control the area through which the air passes. Thus one blast head may be utilized to temper various sizes of glass. Furthermore, the construction of the head is such that one head counterbalances the other head requiring a minimum of power to cause their operation.

Another advantage resides in the fact that the heads may be opened for more than 180° to thus cause a discharge of any glass that may become shattered during the tempering process automatically keeping the blast head clean.

Still other advantages of the invention and the invention itself will become more apparent from the following description of an embodiment thereof which is illustrated by the accompanying drawings.

In the drawings:

FIG. 1 is a plan view of a furnace and the blast head with certain of the parts, which would otherwise be hidden, indicated by dashed lines;

FIG. 1a is a section taken on the line 1A—1A of FIG. 1;

FIG. 2 is a view taken from a plane indicated by the line 2—2 of FIG. 1 and looking in the direction of the arrows;

FIG. 3 is an enlarged plan view of the blast head;

FIG. 4 is a side view thereof with certain parts broken away to show the interior construction;

FIG. 5 is an end view of the blast head;

FIG. 6 is a vertical medial section taken through a pair of jets and their supporting cylinders;

FIG. 6a is a view similar to FIG. 6, showing the position taken by the jets when they are moved;

FIG. 7 is a view similar to FIG. 4, with the blast head in an opened position;

FIG. 8 is a side elevational view of a modified form of blast head, showing a fragment of a conveyor;

FIG. 10 is a view partly in section and partly in elevation taken from a plane indicated by the line 10—10 of FIG. 1, with certain parts omitted for the purpose of clarity;

FIG. 11 is a view similar to FIG. 4 of the modified form of blast head;

FIG. 12 is a plan view thereof, with certain parts removed; and

FIG. 13 is a simplified schematic wiring diagram of a circuit useful with my invention.

Throughout the drawings like parts have been designated by like reference characters.

Figure 9:
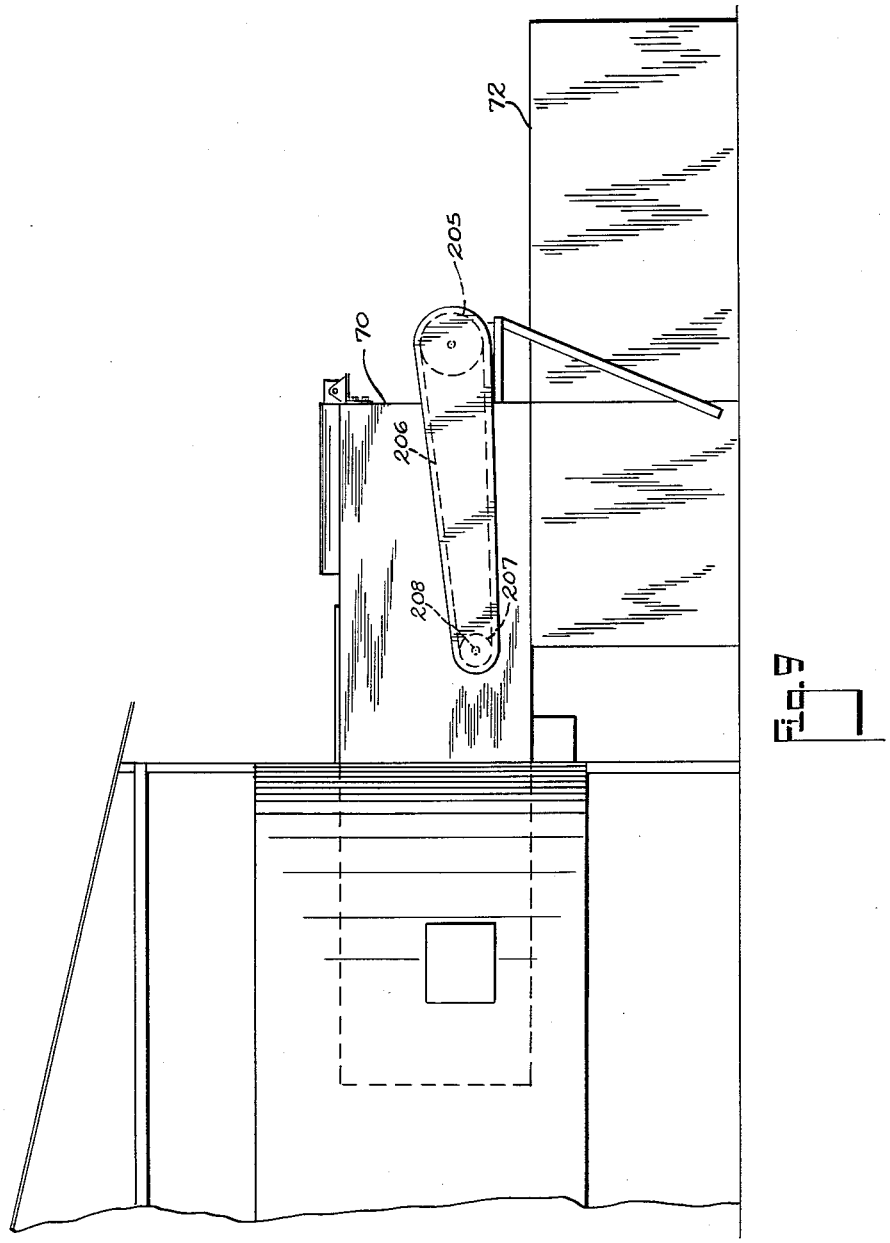
FIG. 9 is a view from the opposite side to that of FIG. 8 and showing a fragment of the furnace.

As best shown in FIGS. 1 and 2, the furnace is in the form of a toroid having a segment removed to provide a blast head station and a loading and unloading station. The furnace includes a flat bottom wall 10, an outside wall 11 and an inner side wall 12 and a dome shaped top wall 13. The walls are preferably made of a suitable insulating material and supported in a framework of steel comprising the uprights 14 and 15 which rest on the floor 16 and the cross beams 17 below the furnace. The beams 14 at their upper ends connect to slanting beams 20 which project radially towards the center and are welded to a substantially cylindrical member 21 which connects the beams together and also furnishes a bearing support for the conveyor mechanism described hereinafter. A suitable head over the entire furnace may be provided.

The innermost wall is provided with a slot 23 which extends entirely around the inner periphery and also out through the end walls at the end of the furnace. A conveyor is provided and includes a central post 25 the bottom of which is supported in a bearing carried by a bearing housing 26 bolted to the floor, and the top in a bearing carried in the housing 27 which in turn is carried by the cylinder 21. Secured to the post spaced from the bottom and extending outwardly are a plurality of radially extending arms 30 which extend through the slot in the furnace and carry the conveyor 31. Additional supports 32 for the conveyor are connected to the posts 25 at 33 and to the conveyor arms 30 at 34. The center post may thus be revolved in its bearings and move the conveyor through the furnace.

As can best be seen in FIG. 1, the conveyor is of polygonal conformation being substantially an octagon, each section being defined by the support and each section having a rectangular glass form supporting portion 40.

Again it will be appreciated that although we have shown an octagon as a matter of convenience there could be more or less segments used without departing from the invention.

Where the conveyor arms pass through the slot in the furnace there is provided a circular ring or wall 36, of ceramic material, carried by the conveyor which substantially closes the slot. Likewise, each of the segments defined by the arms 30 is provided with radially extending similar walls 37 defining the ends of each segment which in this instance extends across the conveyor and which divides each of the segments from each other as will hereinafter appear. Insomuch as the conveyor is rotated in an intermittent fashion stopping at predetermined stations, each of these walls in turn serves as a closure for the slots in the end walls of the furnace.

As stated, the conveyor is adapted to be operated intermittently. This is effected by a motor driven transmission 45 supported below the conveyor and which carries and rotates a circular plate 41 having an upright pin 42 which, when the plate is rotated by the transmission in a counter clockwise direction, enters into one of a plurality of slots 43 each of which is disposed beneath one of the beams 30 and formed by plates 44 depending from the beams. The pin engages with the sides of the slot and as it is moved causes the carrier to be moved which movement continues until the pin leaves the slot. The motor is deenergized just before the pin leaves the slot and thus holds the conveyor in a predetermined position.

Each rotation of the plate 41 is designed to cause the movement of the conveyor 45 degrees so that one segment of the conveyor is moved through one station or, in other words, one eighth of a revolution. Thus the conveyor is moved in timed relation one-eighth of a revolution eight times for a complete cycle of operation, which is effected by intermittently energizing the motor driven transmission.

As can best be seen in FIG. 1, the space between the two ends is substantially one-fourth the circumference of the furnace or equal to two of the segments. One portion provides a position for the blast head and the other, adjacent thereto, a loading and unloading station.

The interior of the furnace is divided into zones, in this instance three, which are each defined by pairs of adjacent segments. Each zone is heated by separate heating means which may be controlled thermostatically to provide temperatures of 1220° in the first zone, 1250° in the second zone and 1320° in the last zone. It will be appreciated that these temperatures may be varied depending upon the type of glass being tempered, the main consideration being that the glass should be heated to the softening temperature in order that it may be bent to the configuration desired which is determined by the forms that support the glass which are carried on the frame 40. The heating is preferably effected by gaseous fuel supplied through a pipe 50, FIG. 1, which comprises a header that is connected to the gas supply by a T 51. The header 50 connects to end branches 52 which in turn connect to branches 53 and 54 that have the burner tubes 55 which extend through the top of the furnace into the interior. Separate branches 56 and 57 connect to intermediate tubes 58 and 59. The adjacent segment is provided with a similar set of tubes. The burners, not shown, direct the burning fuel into the interior of the furnace, suitable baffles being provided. Preferably the direction of the flames providing the heat is across the top portion of the furnace out of contact with the glass. In addition a more even distribution of the heat is effected by means of fans 60 disposed adjacent each set of burners in the top of the furnace, the fans being carried by shafts 61 which extend through the top of the furnace and have sheaves 62 on their ends which are connected by belts 63 to a center sheave 64 which, in this case, is a three groove assembly receiving the belts 63 and a main drive belt 65 driven from a motor 66 which carries a pulley 67.

During operation the motor drives the fans continuously which suck the air through the hole 68 in the center of the baffle 69 and direct the heated air downward along the side of the furnace in such a manner that the heated air also hits the under side of the glass providing an even heating in both sides. The baffles are supported by bolts 69' which extend through the top of the furnace.

The blast head comprises a header, at the end of which is a pair of box-like jaws which are pivotally connected at their bases to the header and may be opened more than 180°, at which time the conveyor is moved to position the glass opposite to the jaws. When the glass is in position the jaws close and surround the glass on the conveyor; air is then sucked into the head through jets and is directed against the glass on both sides to quickly cool the surfaces and set up a compression therein.

As best shown in FIGS. 1 and 2, the blast head and its associated mechanism, are disposed at the outlet end of the furnace. The blast head includes a header for drawing air into it which may take the form of a substantially rectangular box 70 which communicates with a duct 72 disposed below the level of the box 70 on the floor. The duct 72 connects to an opening 73 in the wall 74 of the building. The suction means comprises a motor 75 having a shaft 76 which carries an impeller 77 disposed in the duct 72. The impeller and its motor are designed to draw air through the duct work and exhaust it exteriorly of the building. Means to shut off the suction provided by the motor is disposed in the duct 72 and includes a shutter mechanism 78 controlled by an air cylinder 79. This mechanism is operated in timed relation to the opening and closing of the blast head, the shutters being closed when the blast head is opened and opened to allow full suction effect when the blast head is closed.

The box-like header or manifold 70 is constructed by a reinforcing frame of angle iron the sides of which are closed by heavy sheet metal. As can best be seen in FIGS. 1 and 2 it includes a back member 80 and two side members 81 all of angle iron. In spaced relation below the top member is a similar frame as can be seen from FIG. 2. The two frames are held in spaced relation to each other by corner uprights 82 at the rear. Stanchions 83 are provided forwardly of the uprights 82 connected to the lower frame on opposite sides.

Spaced inwardly of the side angle irons 81 of the manifold and parallel thereto at the top and bottom are angle irons or beams 85. These angle irons support a downwardly slanting angle iron 86, FIG. 4, and an upwardly slanting angle iron 87 which meet at substantially the mid-portion of the box and provide a supporting structure for trunnions 88 on the top iron and 89 on the bottom iron the sets of trunnions being spaced apart on opposite sides and provide spaced aligned bearings for each of the shafts 90 extending between the top trunnions and 91 between the bottom trunnions. Each of the shafts carry spur gears 93 and 94 which are secured on the shafts so that they are outboard of the beams 85. The gears on each side are in mesh with each other and therefore, when rotated, rotate in opposite directions.

Means for rotating the gears is provided and comprises a piston driven rack 96 disposed in engagement with a gear 95 carried on the top shaft 90, which extends beyond the side of the box as can best be seen in FIGS. 1 and 5. The rack is operated by an air cylinder 100 having a piston therein and a rod 101 connected thereto (FIG. 4) and extending downwardly at right angles and connecting to the rack. A pressure roller 97 supported by a bracket 98 is provided, which engages the side of the rack opposite to the teeth, for holding the rack in meshing engagement with the gear.

The inner frame angle irons 85 extend forwardly of the manifold and carry jaw supporting trunnions 105, spaced forwardly at the top and bottom of the manifold. The trunnions support horizontally disposed shafts 106 that extend transversely across the manifold near the top and bottom and each carries pairs of gears 107 on their ends which are in mesh with the top gears 93 and bottom gears 94. It will be seen that when the gears 93 and 94 are rotated that the gears 107 and the shafts 106 are rotated in opposite directions.

The shafts 106 also provide a hinge support for a pair of frames which comprise the jaws of the blast head proper. When the gears are rotated the frames or jaws open or close depending upon the direction of rotation. Preferably the structure is such that they may be opened, as shown in FIG. 7, approximately 230°, and may be closed, as shown in FIG. 4 to provide a box which may be closed around the conveyor. As can best be seen in FIGS. 1 and 3 the blast head may have converging side walls the one on the left disposed close to the radially extending end wall at the exit of the furnace. Each of the frames comprises outer angle irons 110, which as best shown in FIG. 3, slant inwardly, each meeting at their ends with the parallel angle irons 111 which are aligned with the inner angle irons 85 of the manifold. The rear ends of the angle irons 110 abut the outer angle irons 81 of the manifold which at the ends adjacent the angle irons 110 bend slightly as shown at 81'.

The shafts 106, besides extending through the trunnions 105 also extend through the inner ends of the frames 111. This provides a pivotal connection for the jaws to the shafts 106. Since it is the rotation of these shafts that causes the opening and closing of the blast head jaws, in the interest of ease of replacement of wearing parts, it is preferred that the driving connection be from the gears direct to the blast head parts. In this respect the frame 111 has secured to it a bracket 112 which carries an angular projection 113 that is engaged between the teeth of the gears 107. This has an advantage that the gears can be removed at any time along with the shaft and that the opening pressure effected by the gear is from the periphery of the gear directly to the frame spaced from its pivot which eliminates the strains that would otherwise occur if the drive was direct from the shaft to the head. The bracket 112 may be bolted to the member 111 by bolts 114 or welded thereto. If bolted it enables the same to be adjusted as to position.

Depending from the frames of the blast head are heavy sheet metal sides 115 and ends 116. The sides at the point of junction to the manifold are provided with curved edges 117 which match with similar edges on the manifold 70, the curvature being on a radius from the center of the pivot shaft so that when the heads are closed the matching engagement of the two parts provides a reduction in loss of air pressure at this point. The heads are open on the meeting side, and, on the sides opposite thereto, are provided with rectangular openings, the ends of which are defined by the end walls 116, the sides by the frame parts 111 and the rear by a plate 120. The plate 120 abuts the end of the top cover plate 121 for the manifold when the jaws are closed and allows the two jaws defining the blast head to be opened without interference from the manifold and when closed to provide a good air seal. If desired a flexible metal seal may be provided between the manifold and the head providing a more effective seal for the connection between the head and the manifold. It will be seen that this construction when the gears are rotated by the air cylinder and its rack 96 that both heads open in a jaw-like manner. This opening is sufficiently far, as shown in FIG. 7 that the lower jaw discharges any particles that have lodged therein such as frequently happens when a sheet of glass being tempered breaks or explodes.

An important feature is that the interconnection between the two heads by the disclosed gearing is such that the weight of one head counterbalances that of the other head, which decreases the effort necessary to open and close the heads and at the same time enables them to be opened and closed very quickly.

The opening in the top of the top blast head and in the bottom of the bottom blast head is provided with a plurality of jets through which air is directed toward the glass. The support for the jets may take several forms of which two are shown in the drawings. In FIGS. 1 to 7 inclusive, the jets are mounted in cylinders and the cylinders are oscillated in opposite directions to swing the jets opposite to the glass. The other figures illustrate movable plates which carry the jets each of which is reciprocated as a unit in suitable guideways.

As is clearly shown in the drawings a plurality of cylinders 125 are provided and are mounted between the beams 111 with their adjacent surfaces in rolling contact with each other. In the drawings ten of these cylinders are illustrated but it will be apparent that the number may vary depending on the size of the blast head.

Preferably the ends of the cylinders 125 are each provided with heads 126 from which a stub shaft 127 extends axially of the cylinder, being journalled in the beams 111.

As best shown in FIGS. 6 and 6a, the jets comprise tubes 130 which extend through diametrically opposed holes in the cylinder. Preferably the tubes extend beyond the periphery of the cylinders inwardly of the blast head. See FIGS. 4 and 6. A suitable arrangement contemplates cylinders having diameters of two inches and with the tubes through the cylinders at two inch intervals the tubes in adjacent cylinders being displaced so that each tube in one cylinder is midway between the two tubes in the adjacent cylinder. The jets themselves vary in diameter. It has been found that one-half inch diameter tubes provide an efficient jet. The exterior of the tubes is preferably flared at 131 which enables the outer ends to be blocked with suitable plugs, such as corks 132, and in the case of the open jets increases the efficiency of the flow of air therethrough. By means of the plugs, the area covered by the jets may be controlled so that larger or smaller jet areas may be provided, depending upon the size of the piece of glass being tempered. FIG. 3 illustrates how the larger area has been reduced in size by the simple expedient of plugging the outer jets.

A screen 129 shown in FIG. 7 is provided for the lower jaw jets which prevents glass from falling into the jets or between their supporting cylinders.

The staggering of the jets allows them to be placed close together and still permit the jets to swing without interference with each other as illustrated in FIG. 6a.

The cylinders are arranged to be oscillated in opposite directions, which is facilitated by the surface contact with each other. In effecting this operation alternate ones of the cylinders are linked to each other. For instance, in FIG. 4 starting on the left the 2nd, 4th, 6th, 8th and 10th cylinders have levers 134 which are secured to their stub shafts and connected to each other by a link 135. Likewise 1st, 3rd, 5th, 7th and 9th cylinders have levers 136 connected to their stub shafts and are connected to each other by a link 137. In each instance the odd numbered cylinders have the levers projecting inwardly of the head and the even numbered cylinders have the levers projecting outwardly of the head so that when they are moved there is no interference with each other and enables them to be rotated in opposite directions.

The bottom head portion is provided with like levers and links in the same manner.

The link connecting the odd numbered cylinders as well as the levers extends inside the head and at one end near the manifold is provided with a right angled downward extension 138, the end of which is provided with a lateral extension 139.

On the other side of the heads the levers 134 and link are outside the head. The lever 134 connecting with the fourth cylinder from the left, as viewed in FIG. 4, is provided with a downward extension 141 having an offset 142.

Again the same arrangement is provided for the bottom jaw.

Means is provided to reciprocate the levers 134 and 136 in opposite directions and includes a motor 150, FIG. 3, conveniently mounted at the rear of the manifold and connected by a belt 151 to rotate a shaft 152 which carries a crank 153 connected to a pitman 154.

The pitman 154 may comprise a rod which extends through a bushing 155 on the rear of the manifold through the back wall into the interior where it branches out into upper and lower rods, FIG. 7. Both branch rods carry V blocks 158 and 159 at their ends which engage with the offsets 139 connected to the first cylinder of the top and bottom heads.

A lever 162 is pivotally supported at 164 on a post 163 carried at the rear of the manifold and connected at 165 to the rod 154. The other end of the lever 162 is pivotally connected to a rod 170 at 171. The rod 170 extends through a bushing 173 into the manifold and, when the lever 162 is rocked, is reciprocated in the opposite direction to the rod 154. This rod likewise branches interiorly of the manifold to provide upper and lower branches 170a and 170b which carry V blocks 158a and 159a for the reception of the offsets 142 on the levers 141 connected to the even numbered cylinders.

When the motor 150 is energized the cylinders are reciprocated in opposite directions by the mechanism, the even numbered cylinders in the top and bottom being reciprocated to move their jets in the same direction while the odd numbered cylinders are all moved in the opposite directions. The jets are thus swung back and forth opposite to the glass on opposite sides to direct streams of cool air against the heated surface.

Means is provided for absorbing the opening and closing shock of the heads and to thus relieve the strain on the gearing which effects the opening and closing. As best illustrated in FIG. 7 each of the heads is provided with an upstanding bracket 180 which has pivotally connected thereto at 181 a shock rod 182. Each shock rod extends slidably through a sleeve 183 carried on the end of a shock absorber lever 184. The bodies 185 of the shock absorbers are mounted on the top and bottom of the manifold. In addition each of the rods is provided with springs 186 and 187 disposed on opposite ends of the rod, a collar 188 fixed on the rod near its point of connection to the bracket 180 furnishes a stop for the end of the spring 187 and a collar 189 adjustably positioned on the end of the rod by a nut 190 threaded on the rod provides a stop for the spring 186. The sleeve 183 is provided with flanges which serve as abutments for the inner ends of the springs, or these may be loosely disposed on the rod to effect the same purpose.

As can be seen in FIGS. 7 and 3, when the jaws open the spring 187 engages the flange on the sleeve 183 which is connected to the shock absorber, both the spring and the shock absorber cooperate in absorbing the shock of opening. When the jaws close the spring 186 engages with the sleeve which has been moved rearward, as the jaws opened, and moves the sleeve forward. The same cooperation is provided between the spring and shock absorber which enables the jaws to be closed quickly but gently.

The cycle of operation may be timed such that first the jaws of the blast head open at which time any broken glass will fall from the screen in the lower jaw to the floor. The opening of the jaw heads being effected by the air cylinder the time of opening being controlled by a suitable clock type timer mechanism. At the same time the air shutter cylinder 79 is operated to close the shutters shutting off the vacuum. At the same time the jaws are opened the drive 45 is started, a switch operated by a lug on the gear rack is disposed in the motor drive circuit as a safety precaution. The rotation of the plate carries the pin counterclockwise as viewed in FIG. 1 into the slot on the next arm and rotates the conveyor with its tempered glass so that the segment in the blast head moves to the unloading station adjacent the blast head. At the same time another piece of glass is carried into the blast head.

The same control which energizes the piston 79 to open the blast head may also energize the cylinder 79 to close the shutters 78 shutting off the vacuum.

When the plate 41 reaches the position shown in FIG. 1, where the pin 42 is about to emerge from the slot 43, at which time the conveyor is no longer moving, a limit switch controlled by a cam on the plate 41 deenergizes the transmission 45 stopping the rotation of the plate 41. At this same time the solenoid which admits air into the other end of the cylinder 100 shifts the valve and operates the cylinder in the other direction closing the jaws. It will be noted that the stopping of the conveyor with the newly heated piece of glass between the jaws is followed instantly by the closing of the jaws.

When the jaws were raised the jets ceased to move because the levers were withdrawn from their connection with the V blocks 158 and 159. The reciprocating mechanism is normally stopped as the jaws start to open, and when the jaws close the offsets 139 readily find their positions into the V blocks because of the slanting surface, and as the jaws close the jets immediately start reciprocating again at the same time the air starts flowing through the jets.

At the same time the jaws close the cylinder 79 is operated to open the shutter 78, and the vacuum drawn by the fan causes the air to be sucked in through the reciprocating jets under a predetermined amount of pressure causing streams of cool air to impinge against the heated glass surface from opposite sides to effect the tempering.

The time that the jaws remain closed is accurately controlled by the clock timer which may be set for a predetermined number of seconds depending upon the type of glass being tempered.

The timer then determines the elapsed time between the start and end of the cooling of the glass, after which it energizes the circuit to start the cycle over.

In FIGS. 8 to 12 inclusive I have illustrated another embodiment of the invention where the jets for each jaw of the blast head are supported in a flat plate which is reciprocable in ways. By this construction there is no need for a screen over the bottom jets and troubles due to broken glass falling between the jet cylinders are completely eliminated. Furthermore the number of wearing parts is greatly reduced and the weight of the heads is materially decreased.

As shown in FIG. 8 the manifold 70 and its duct 72 are the same as in the other embodiment. Likewise the gears for controlling and connecting the jaws to each other are provided as previously described, together with the control cylinder 100.

The general construction of the jaws is similar having the side walls 200 which are made of heavy sheet steel. The frame which comprises the members 111 that define the opening in the upper and lower jaws are each being provided with ways 201 on their inner edges which extend longitudinally along the side of the jaw facing inwardly toward the center of the blast head. A rectangular plate 202 is slidably disposed in the opposite sets of ways for each jaw and each plate carries a plurality of jet tubes 203 which project into the interior of the head. The tubes are disposed in rows, those in the adjacent rows being staggered in respect to each other. The tubes, FIGS. 6 and 6a, have the upper ends flared outwardly and may be secured in apertures in the plate by a press fit or by welding. The flared conformation permits the insertion of plugs for the purpose previously described.

The upper and lower jet plates are simultaneously reciprocated in their ways by a motor 205, FIG. 9, which is supported on a platform at the rear of the manifold and is connected by a belt 206 to a sheave 207 on a shaft 208 which projects through the sides of the manifold. Interiorly of the manifold the shaft 208 carries two sheaves 209 which are disposed just outside of the gears 93. The top shaft 90 is provided with a sheave 210 which is rotatably journalled in the shaft on suitable bearings not shown and carries a crank pin 211 which connects to a pitman 212. The bottom shaft 91 is provided with a sheave 210b, crank 211b and pitman 212b in a like manner. The two sheaves 210 and 210b are connected to and driven by the sheaves 209 by belts or chains 214.

When the motor is energized the sheaves 210 and 210b are rotated in the same direction reciprocating the pitmans 212 and 212b in the same direction. The pitmans reciprocate the jet plates which each have cross beams 220 welded to their outer faces, these beams extending outwardly of the jet plates and having downwardly and upwardly extending projections 221 and 221b which are pivotally connected to the pitmans. A curved feathering plate 222 of relatively thin flexible sheet metal carried by the manifold rides on top of the manifold end of the jet plate to provide a seal.

The front end of the jaws do not have the fixed plate shown in the other embodiment and are closed by plates 225 and 225b which are hingedly connected at 226 and 226b to the upper and lower jet plates respectively. The top plate hangs downward and rests on a cross beam 228 secured to the lower side and front edges of the top jaw. Abutments 227 disposed approximately midway between the top and bottom of the top jaw limit the movement of the plate outward.

The plate for the bottom also rides against a similar cross beam 228b on the lower jaw and is limited in its swinging movement by pins 229 similar to the pins 227.

Normally during operation when glass is being tempered, the suction within the blast head is sufficient to hold the plates 225 and 225b against the cross beams 228 and 228b. When the heads are open however the lower plate may move outward against the pins 229 which facilitates the discharge of broken glass from the interior. When the jet plates are reciprocated the closure plates 226 and 226b slide back and forth across the cross beams 228 and 228b. The reciprocation of the plates continues during the cooling cycle but preferably the motor 205 is deenergized when the jaws are open. Otherwise the operation is the same as for the other embodiment.

It will be appreciated that with the desired results in mind that various ways and means of achieving these results may be obtained with the apparatus shown. For instance it is contemplated that the air cylinders be operated by electrically actuated valves. It will be apparent however that certain of the valves could be operated mechanically.

In order therefore to provide a better understanding of the invention a simplified circuit diagram is illustrated in FIG. 13 as being an example of how the apparatus could be controlled.

It will be appreciated that in actual practice because of the heavy loads and, because it has other advantages, a three phase system may be used particularly in connection with the motor drive 45. For instance the drive motor for the conveyor should preferably be one that can be stopped quickly, which is usually effected by reversing it. The timer should be one where the time interval for the cooling cycle may be adjusted.

In the circuit illustrated it is assumed the change cycle has just started. The timer A which has been set for the cooling cycle and this cycle being completed, it has energized the motor driven transmission 45 to start rotating the plate 41 to move the pin 42 out of the slot 43. The valves B and C for controlling the vacuum shutter 78 and jaw opening cylinder 100 has operated to actuate the cylinder 79 and close the shutter 78 and the cylinder 100 to open the jaws of the blast head.

The plate 41, which actuates the conveyor revolves and the pin 42 is moved out of the slot 43 and is carried around to the point where it is nearly ready to enter the next succeeding slot 43'. In the meantime the cam D on the plate 41 engages a limit switch E which is connected so that it may deenergize the motor circuit. For simplicity it is shown in series with the motor circuit. Connected in parallel with that same switch is a second switch F which has been actuated to a closed position by the opening of the jaws. This switch is preferably operated by the jaws themselves but it could be operated by the gear rack that opens the jaws.

Thus a safety provision is realized in that if the jaws have not opened to the proper distance to close the switch F the switch E would stop the motor and no damage would be done to the jaws or conveyor if movement should occur before the jaws are open.

Assuming that the jaws have properly opened however the pin 42 moves into the slot 43' and the conveyor is moved one segment until the slot 43' arrives at the place where the slot 43 previously stood.

At this time the cam D operates the switch G which shuts off the motor drive 45 and the conveyor stops suddenly with the pin still engaged in the slot. This assures proper position of the conveyor segment relative to the blast head and prevents movement thereof during the cooling cycle. With the deenergization of the motor, the valves B and C are operated to close the jaws, open the shutter and start the timer for the cooling cycle.

The jets are operated and the cooling continues until the time set by the timer has elapsed, after which the motor transmission 45 is again started, the jaws open, the vacuum is shut off and the cycle repeated.

It will thus be seen that we have provided a glass tempering apparatus which is exceedingly simple to operate with a minimum of personnel.

It is also apparent that it eliminates the need for a conveyor having sliding parts that are impaired in their operation due to heat. No chains with their accompanying breakage troubles and lubrication troubles are present and there are no parts which cause undesirable friction which are subject to extreme heat, and there are no hot metal parts to be disturbed by handling the same.

The jaws of the blast head are substantially self-cleaning and because of their manner of connection and operation require but little power for their operation and may be operated quickly. Furthermore the cooling area may readily be controlled thus increasing the efficiency.

Due to the fact that the system is operated by a vacuum and the hot air exhausted exteriorly of the building the working conditions are greatly improved due to the cooler operation.

Having thus described the invention it is appreciated that numerous and extensive departures may be made from the disclosure without departing from the scope of the invention as defined in the appended claims.

We claim:

1. A blast head for a glass tempering mechanism comprising a header, a pair of frames hingedly supported at the end of the header and together with the header forming a box having closed sides and an open top and bottom, jet means for filling and closing the top and bottom each of which comprises a member reciprocably disposed in said frame, jets carried by said members providing openings from the ambient atmosphere to the interior of the box, means connected to said members for reciprocating them and means connected to said header for drawing air through said jets into the box and through the header.

2. An apparatus as described in claim 1 wherein the jets, on the side open to atmosphere, are flared outwardly.

3. A blast head for a glass tempering mechanism including a header, a pair of frames supported by the header and movable toward and away from each other to a closed and open position to permit access therebetween, said frames being an extension of the header when in the closed position and providing side and end walls closed to the atmosphere and oppositely disposed open ends, sets of jet means for filling and closing said open ends, each set comprising a row of cylinders pivotally disposed in said frames and juxtaposed to each other in tangential contact, each of said cylinders carrying a row of jet tubes extending through the cylinders and each having one end opening to the ambient atmosphere and the other end extending inward toward a plane defined by the meeting line of said frames, means for oscillating said cylinders to swing said jets in arcs, and vacuum drawing means connected to said header for drawing air through the jets into the header.

4. A blast head for a glass tempering mechanism comprising a header, a pair of frames hingedly supported at the end of the header, means for swinging said frames about their pivots to open and close the frames, jet means carried by said frames in spaced relation to each other, said jet means for each frame comprising a plurality of cylinders disposed in a row with their adjacent surfaces in contact with each other and closing said frames on opposite sides to each other, means connected to alternate cylinders in each frame for oscillating adjacent cylinders in opposite directions to provide rolling contact, each of said cylinders having a row of tubes extending through the cylinder with the ends open to ambient atmosphere and with the other ends projecting into the frame toward the jets in the other frame, said jets in adjacent cylinders being in staggered relation to each other and capable of swinging movement between each other when the cylinders are oscillated.

5. The apparatus as claimed in claim 4 wherein plug means is provided disposed in the open ends of the selected tubes otherwise open to atmosphere.

6. A glass tempering mechanism including a furnace in the form of a hollow curved ring with a segment removed to define ends providing an entrance and an exit, the inner periphery of said furnace being formed with a continuous slot opening to the interior of the furnace and through the ends, a rotatable center support disposed centrally of said ring, a conveyor for carrying sheets of glass extending through said slot into the interior of said furnace and connected to said center support to turn therewith, renewable closure means carried by said conveyor and closing said slot, said conveyor also carrying radial partitions arranged to be carried into closing position for the ends of said slot by intermittent rotary movement of the conveyor, a blast head disposed at the exit to said furnace and said removed segment providing an open space for access to the conveyor to provide a loading station at the entrance adjacent the blast head, said blast head including a pair of movable frames disposed respectively at opposite sides of the conveyor, means for movably supporting said frames and means to move said frames toward and away from each other, said frames when moved toward each other surrounding said conveyor at said exit, and movable jet means carried by said frames for directing jets of air onto the glass on said conveyor from opposite sides.

7. The mechanism of claim 6, wherein said conveyor is supported to move horizontally, and said frames are disposed respectively above and below said conveyor at said exit.

8. The mechanism of claim 6, wherein there is provided manifold means connected to the blast head and means for drawing air through the blast head and into said manifold.

9. The mechanism of claim 8, wherein there is provided means controlling the flow of air through the manifold in timed relation to the movement of said frames toward and away from each other.

10. A blast head for tempering glass comprising a pair of frames, hinge supports for said frames for selectively positioning the frames in confronting relation to one another or swung apart from one another, and a plurality of fluid jets carried by each of said frames to direct fluid streams onto glass positioned between said frames when the frames are in confronting relation to one another, said frames being supported to be swung about horizontal axes which are displaced vertically from one another and extend horizontally one above the other when in confronting relation to one another, the lower frame of said pair being mounted to be swung more than 90° down away from its horizontal position to discharge broken glass.

11. A blast head for tempering glass comprising a pair of frames, hinge supports for said frames for selectively positioning the frames in confronting relation to one another or swung apart from one another, and a plurality of fluid jets carried by each of said frames to direct fluid streams onto glass positioned between said frames when the frames are in confronting relation to one another, the hinge support for each frame comprises a shaft, a rotatable gear on said shaft, and a member carried by the frame and engaging the toothed periphery of the gear to cause the frame to turn as a unit with the gear about the axis of said shaft when the gear is turned.

12. The blast head of claim 11, wherein said hinge supports comprise shafts for hingedly supporting each frame, gears on said shafts, and connecting gears for interconnecting said shafts to each other.

(References on following page)

References Cited in the file of this patent

UNITED STATES PATENTS

| | | |
|---|---|---|
| 931,663 | Wilbur | Aug. 17, 1909 |
| 1,617,955 | Kutchka | Feb. 15, 1927 |
| 1,951,950 | Rising | Mar. 20, 1934 |
| 2,032,008 | Galey | Feb. 25, 1936 |
| 2,042,521 | Ford | June 2, 1936 |
| 2,042,610 | Littleton | June 2, 1936 |
| 2,131,404 | Long | Sept. 27, 1938 |
| 2,140,282 | Drake | Dec. 13, 1938 |
| 2,160,065 | Ford | May 30, 1939 |
| 2,170,749 | Forbes | Aug. 22, 1939 |
| 2,185,101 | Brell | Dec. 26, 1939 |

FOREIGN PATENTS

| | | |
|---|---|---|
| 403,438 | Great Britain | Dec. 21, 1933 |
| 626,078 | Germany | Feb. 20, 1936 |